Patented Feb. 7, 1928.

1,658,229

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

BENZYL RESORCINOLS.

No Drawing.   Application filed October 9, 1923.   Serial No. 667,494.

This invention relates to a new chemical substance, benzyl resorcinol, and includes both the new chemical substance and the method of its production.

The new compound is obtainable from resorcinol by the action of benzoic acid in the presence of a condensing agent, such as zinc chloride, with resulting production of an intermediate ketone, benzoyl resorcinol, which is then subjected to reduction to produce therefrom the benzyl resorcinol.

The invention will be further illustrated by the following specific example. The parts are by weight:—

There is heated together in an open vessel 50 parts of resorcinol, 75 parts of benzoic acid and 75 parts of zinc chloride until the reaction begins. The source of heat is removed and the reaction allowed to continue until it ceases. Upon adding water there separates out a reddish yellow oily substance which is benzoyl resorcinol, a ketone of the formula $C_6H_3(OH)_2.COC_6H_5$, and some unacted upon benzoic acid. To this mixture is added enough sodium carbonate to dissolve both the ketone and the benzoic acid. Carbonic acid gas is then passed thru this mixture when the ketone is thrown out of solution as an oil and can be separated readily from the aqueous solution. It is purified by recrystallization from benzol when it appears in the form of white crystals with melting point 142–143 degrees C. The new ketone so produced is then mixed in a vessel supplied with a reflux condenser with zinc amalgam and dilute hydrochloric acid in the proportion of 50 parts of ketone, 200 parts of zinc amalgam and 600 parts of dilute hydrochloric acid and boiled for 10 hours or more. As a result a pale yellow to colorless oil separates out of the aqueous liquid. This is separated, redistilled in vacuo and recrystallized from benzol when it separates out in white crystals.

The product thus produced is the new substance benzyl-resorcinol $C_6H_3(OH)_2.CH_2C_6H_5$

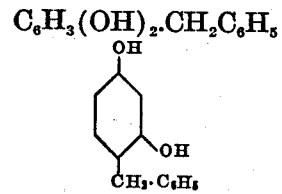

and is thus obtained in white crystals of melting point 78°–79° C. and boiling point 220–222° C. at 10 mm. pressure, soluble in 1 to 250 parts of warm water, remaining in solution on cooling; easily soluble in alcohol, ether and warm benzol; possesses a phenol coefficient of about 18 by the Rideal Walker method (U. S. Hygienic Laboratory modification). It is nontoxic and possesses valuable therapeutic properties, among which may be mentioned those of a germicide and antiseptic.

I claim:

1. The method of making benzyl resorcinol which comprises subjecting purified benzoyl resorcinol to the action of zinc amalgam and hydrochloric acid and subjecting the resulting impure benzol resorcinol to a vacuum distillation followed by a recrystallization from benzol.

2. The method of making benzyl resorcinol which comprises subjecting purified benzoyl resorcinol to reduction.

3. The method of producing benzyl resorcinol which comprises subjecting benzoyl resorcinol to the action of zinc amalgam and hydrochloric acid and subjecting the resulting impure benzyl resorcinol to vacuum distillation followed by recrystallization from benzol.

4. As a new product, benzyl resorcinol of the formula $C_6H_3(OH)_2.CH_2.C_6H_5$, said product in a pure state forming white crystals, melting point 78–79° C. and having valuable therapeutic properties.

5. Process of manufacturing benzyl resorcinol, consisting of boiling together benzoyl resorcinol, amalgamated zinc and dilute hydrochloric acid.

In testimony whereof I affix my signature.

ALFRED R. L. DOHME.